United States Patent
Secker-Walker et al.

(10) Patent No.: US 10,665,245 B2
(45) Date of Patent: *May 26, 2020

(54) AUTOMATIC SPEAKER IDENTIFICATION USING SPEECH RECOGNITION FEATURES

(71) Applicant: Amazon Technologies, Inc., Seattle, WA (US)

(72) Inventors: Hugh Evan Secker-Walker, Newburyport, MA (US); Baiyang Liu, Bellevue, WA (US); Frederick Victor Weber, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/448,788

(22) Filed: Jun. 21, 2019

(65) Prior Publication Data

US 2019/0378517 A1 Dec. 12, 2019

Related U.S. Application Data

(63) Continuation of application No. 15/420,018, filed on Jan. 30, 2017, now Pat. No. 10,332,525, which is a
(Continued)

(51) Int. Cl.
*G10L 15/22* (2006.01)
*G10L 15/26* (2006.01)
(Continued)

(52) U.S. Cl.
CPC .............. *G10L 17/06* (2013.01); *G10L 15/18* (2013.01); *G10L 17/02* (2013.01); *G10L 17/12* (2013.01);
(Continued)

(58) Field of Classification Search
CPC ................................ G10L 15/04; G10L 15/20
See application file for complete search history.

(56) References Cited

U.S. PATENT DOCUMENTS

| 5,897,616 A | 4/1999 | Kanevsky et al. |
| 6,308,155 B1 | 10/2001 | Kingsbury et al. |

(Continued)

OTHER PUBLICATIONS

Takahiro Oku, Shoei Sato, Akio Kobayashi, Shinichi Homma, and Toru Imai; Title: Low-Latency Speaker Diarization Based on Bayesian Information Criterion With Multiple Phoneme Classes; Date: Mar. 25-30, 2012; Publisher: IEEE; Edition published in Acoustics, Speech and Signal Processing (ICASSP); pp. 4189-4192.

*Primary Examiner* — Shreyans A Patel
(74) *Attorney, Agent, or Firm* — Knobbe, Martens, Olson & Bear, LLP

(57) ABSTRACT

Features are disclosed for automatically identifying a speaker. Artifacts of automatic speech recognition ("ASR") and/or other automatically determined information may be processed against individual user profiles or models. Scores may be determined reflecting the likelihood that individual users made an utterance. The scores can be based on, e.g., individual components of Gaussian mixture models ("GMMs") that score best for frames of audio data of an utterance. A user associated with the highest likelihood score for a particular utterance can be identified as the speaker of the utterance. Information regarding the identified user can be provided to components of a spoken language processing system, separate applications, etc.

20 Claims, 5 Drawing Sheets

Related U.S. Application Data continuation of application No. 13/957,257, filed on Aug. 1, 2013, now Pat. No. 9,558,749.

(51) Int. Cl.

| | | |
|---|---|---|
| *G10L 15/30* | (2013.01) | |
| *G10L 17/06* | (2013.01) | |
| *G10L 17/12* | (2013.01) | |
| *G10L 17/02* | (2013.01) | |
| *G10L 17/16* | (2013.01) | |
| *G10L 15/18* | (2013.01) | |
| *G10L 17/22* | (2013.01) | |
| *G10L 15/20* | (2006.01) | |
| *G10L 15/02* | (2006.01) | |
| *G10L 15/08* | (2006.01) | |

(52) U.S. Cl.
CPC .............. *G10L 17/16* (2013.01); *G10L 17/22* (2013.01); *G10L 15/20* (2013.01); *G10L 15/26* (2013.01); *G10L 2015/025* (2013.01); *G10L 2015/088* (2013.01)

(56) References Cited

U.S. PATENT DOCUMENTS

| | | | | |
|---|---|---|---|---|
| 6,421,645 | B1* | 7/2002 | Beigi | .................. G06K 9/6226 |
| | | | | 704/272 |
| 8,700,392 | B1* | 4/2014 | Hart | ....................... G10L 15/25 |
| | | | | 704/231 |
| 9,390,708 | B1 | 7/2016 | Hoffmeister | |
| 9,401,140 | B1* | 7/2016 | Weber | .................... G10L 15/00 |
| 9,558,749 | B1 | 1/2017 | Secker-Walker et al. | |
| 10,332,525 | B2 | 6/2019 | Secker-Walker et al. | |
| 2002/0123891 | A1* | 9/2002 | Epstein | ................. G10L 15/197 |
| | | | | 704/235 |
| 2007/0118372 | A1* | 5/2007 | Wise | ....................... G10L 15/26 |
| | | | | 704/235 |
| 2008/0082326 | A1* | 4/2008 | Venkataraman | ........ G10L 15/20 |
| | | | | 704/228 |
| 2009/0037171 | A1* | 2/2009 | McFarland | ............. G10L 15/26 |
| | | | | 704/235 |
| 2010/0198598 | A1 | 8/2010 | Herbig et al. | |
| 2011/0218802 | A1* | 9/2011 | Bouganim | ............. G10L 15/04 |
| | | | | 704/211 |
| 2013/0311184 | A1* | 11/2013 | Badavne | ................. G10L 15/14 |
| | | | | 704/250 |
| 2014/0379340 | A1 | 12/2014 | Timem et al. | |

\* cited by examiner

AUTOMATIC SPEAKER IDENTIFICATION USING SPEECH RECOGNITION FEATURES

CROSS-REFERENCE TO RELATED APPLICATION

This application is a continuation of U.S. application Ser. No. 15/420,018, filed Jan. 30, 2017, which is a continuation of U.S. application Ser. No. 13/957,257, filed Aug. 1, 2013, now U.S. Pat. No. 9,558,749, the contents of both of which are incorporated by reference herein in their entireties.

BACKGROUND

Computing devices can be used to process a user's spoken commands, requests, and other utterances into written transcriptions. In a common application, a user can speak into a microphone of a computing device, and an automated speech recognition module executing on the computing device can process the audio input and determine what the user said. Additional modules executing on the computing device can process the transcription of the utterance to determine what the user meant and/or perform some action based on the utterance.

Automatic speech recognition systems typically include an acoustic model and a language model. The acoustic model is used to generate hypotheses regarding which subword units (e.g., phonemes) correspond to an utterance based on the acoustic features of the utterance. The language model is used to determine which of the hypotheses generated using the acoustic model is the most likely transcription of the utterance based on lexical features of the language in which the utterance is spoken.

In some automatic speech recognition systems, users can be identified from spoken utterances. In a simple case, a user may identify himself by name or by using some other identifier, and the automatic speech recognition process generates a transcript which is used to determine the speaker's identity. In some cases, a user may be identified by building and using customized acoustic models for speaker identification. Such models are trained to maximize the likelihood scores for specific users when processing utterances made by those users.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
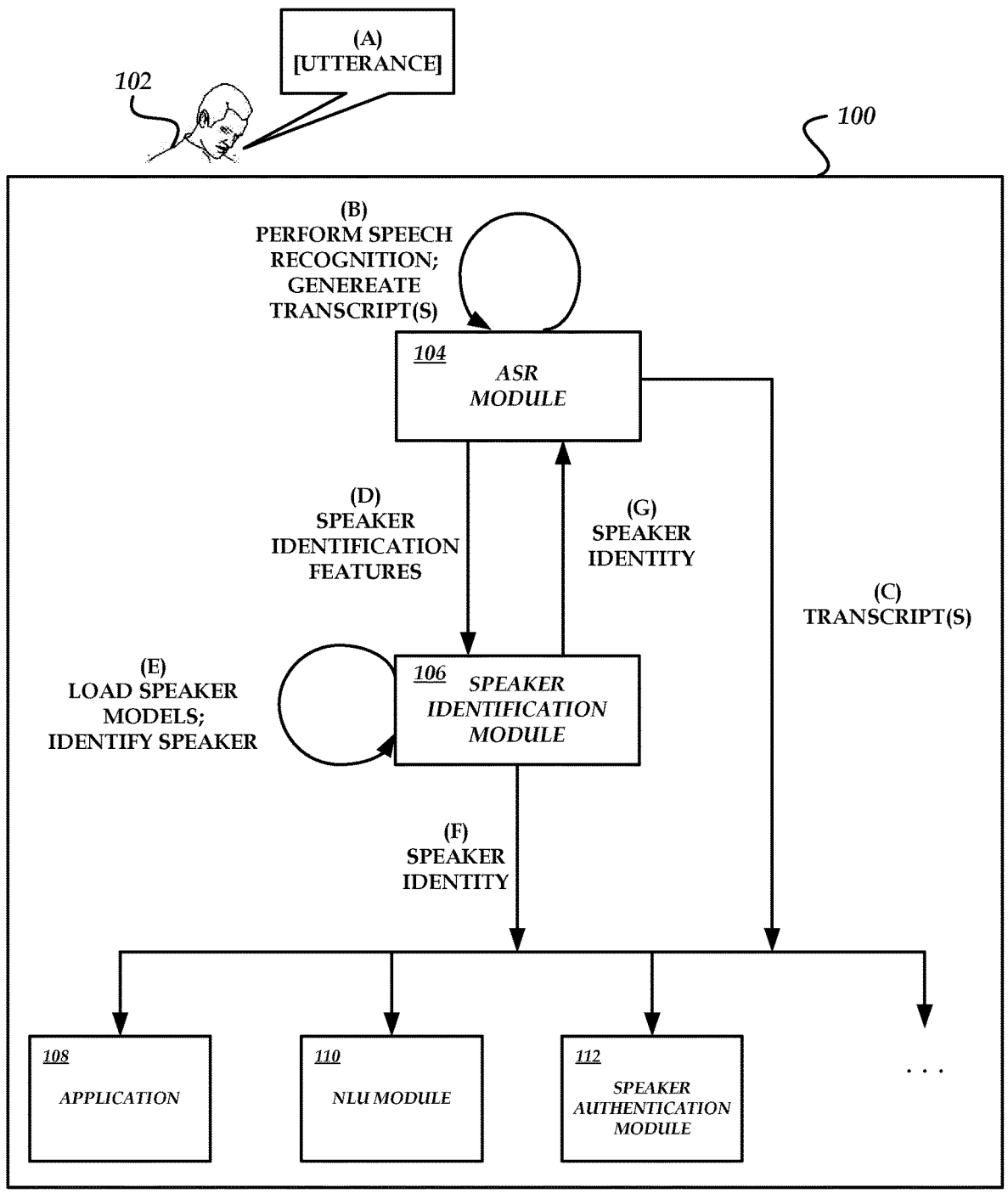
FIG. 1 is a block diagram of illustrative interactions between components of a spoken language processing system to process user utterances and identify speakers of the utterances.

Automatic speech recognition ("ASR") systems use various techniques to process a user utterance and determine an identity of the user. In some ASR systems, a user may identify himself or herself by name or by using some other identifier, such as a passphrase. The ASR system can generate a transcript to determine the user's identity (e.g., when expressly supplied by the user) or match acoustic contours of a spoken passphrase against prior saved instances of the passphrase to identify the user. As a consequence, these systems require the user to supply identification information in addition to a spoken command upon which the user wishes the system to act. In some other ASR systems, customized acoustic models are built and used to maximize likelihood scores for specific users when processing utterances made by those users.

Aspects of this disclosure relate to determining the identity of speakers by using artifacts of ASR processing (e.g., features with values that vary depending upon the speaker) and other data that can be automatically determined. When a speaker utters a command, audio of the utterance can be processed by an ASR system to generate one or more transcripts of the user utterance. Certain speaker-specific information is generated or discovered during ASR processing, and that information can be used to help determine the identity of the speaker. The information can be processed against individual speaker profiles or models in order to identify which user most likely made the utterance. For example, frames of utterance audio data can be matched to phonemes or other speech units by using an acoustic model. The acoustic model may include one or more Gaussian mixture models ("GMMs") for each speech unit (e.g., phoneme) in a language. The GMM for any given phoneme may include a large number of Gaussian components (e.g., 40) that correspond to various ways in which a phoneme may be spoken by a user and represented by the ASR system. Differences in speakers' acoustic characteristics can lead to different GMM components scoring best during recognition of the same words when spoken by different users. The most likely or otherwise highest scoring component of the GMM can be determined for given frame of utterance audio data. Models for individual speakers can include information regarding which components of individual GMMs are typically associated with the speaker's utterances. The highest-scoring components for the current utterance can be processed against the speaker models for multiple speakers to identify the most likely speaker of the current utterance.

The techniques described herein are not limited to processing the highest scoring GMM components against those typically used by speakers. Rather, the techniques and embodiments are illustrative only. Generally described, automatic speaker identification modules, components, and systems may use any speaker identification feature and/or other automatically determined information to determine the identity of a speaker. As used herein, the term "speaker identification features" refers to features, associated with an utterance, whose values depend upon the speaker. Speaker identification features do not necessarily have values that are unique to a particular speaker, but rather the particular values determined for a given utterance depend upon the speaker of the utterance. For example, two or more speakers may be associated with the same "speaker-specific" features for a given frame of utterance audio. By looking at these associations across multiple frames, a particular speaker may be identified.

In spoken language processing systems that are configured to recognize oft-spoken keywords or command phrases, the system can obtain many examples of a small set of transcripts. As a result, the system can learn precise patterns of the GMM component sequences for individual users. These patterns can be stored in user models (e.g., as an acoustic signature for the user). Additional examples of speaker identification features and other ASR processing artifacts that can be used to determine a speaker's identity include, but are not limited to, the durations of particular subword unit states in an ASR result, which pronunciation of a word is used by the speaker, where vocal stress is applied by the speaker, the vocal-track-length-normalizing factor that is built or selected for the speaker, the channel mean normalization that is built or selected for the speaker, measures based on the constrained maximum likelihood linear regression ("cMLLR") transform that is built or selected for the speaker, etc. Other information that may be automatically determined by the ASR module or speaker identification module includes, but is not limited to, time of day, recent patterns of system usage, scheduled or recurring events for which the speaker is likely to use the system, etc.

Although aspects of the embodiments described in the disclosure will focus, for the purpose of illustration, on a spoken language processing system that receives spoken input in the form of utterance audio data and uses hidden Markov model ("HMM") based processing to identify the speaker of the utterance, one skilled in the art will appreciate that the techniques disclosed herein may be applied to any number of software processes or applications. For example, a system may use neural networks, bags of components, minimum edit distance, conditional random fields, or any clustering and classification method appropriate to time series features. Various aspects of the disclosure will now be described with regard to certain examples and embodiments, which are intended to illustrate but not limit the disclosure.

With reference to an illustrative embodiment, FIG. 1 shows example interactions and data flows between various speech recognition and speaker identification modules and other modules or components of a spoken language processing system 100 in response to receipt of a spoken utterance. FIG. 1 shows a speaker 102 making an utterance at (A) that includes a spoken command for a computing system to perform some task. In one specific non-limiting example, the utterance may include a keyword used to indicate that the speaker is addressing the system (also known as a "wake word"), followed by a command (e.g., to play music, dial a phone, search for content, etc.). As used herein, the term "wake word" refers to any word or phrase that a speaker uses to address a spoken language processing system instead of, e.g., pressing a button.

As shown in FIG. 1, the utterance may be provided to a spoken language processing system 100 implemented on computing device such as a mobile phone configured with a microphone and application software to implement the features described herein. The spoken language processing system 100 may include an ASR module 104, a speaker identification module 106, and various other modules or components associated with language processing, such as one or more applications 108, an NLU module 110, a speaker authentication module 112, and the like.

The utterance can be processed by the ASR module 104 at (B), and one or more transcripts of the utterance can be generated. The transcripts can be provided to other system modules at (C). As will be described in greater detail below, speaker identification features may be obtained and/or generated by the ASR module, and these speaker identification features (e.g., features, associated with an utterance, whose values depend upon the speaker, such as the GMM components IDs which scored highest for the current utterance or some portion thereof) can be provided to the speaker identification module 106 at (D).

The speaker identification module 106 can load speaker models for one or more users of the system 100 at (E). As will be described in greater detail below, the speaker identification module 106 can then use the speaker-specific data and the speaker models to determine the identity of the speaker of the current utterance. The speaker's identity can then be provided to various other system components at (F). It is useful to automatically identify the speaker and provide the speaker's identity to other system components in order to improve the speaker's experience. For example, automatic speaker identification can be used to facilitate speaker-specific configurations, behaviors, recommendations, features, and the like.

In some embodiments, as shown, the speaker's identity can be provided to the ASR module 104 at (G). The ASR module 104 can use the speaker's identity to improve accuracy and command-success (e.g., by loading and using speaker-specific acoustic models and/or transforms in future ASR passes, rescoring a current utterance with speaker-specific models or transforms, etc.), thereby improving a user's experience. For example, if the identity of the speaker can be determined shortly after the speaker begins speaking, the ASR module 104 and/or other modules of the spoken language processing system 100 can be adjusted so as to be more accurate for the speech and intents of that specific speaker.

Spoken Language Processing System Environment

Figure 2:
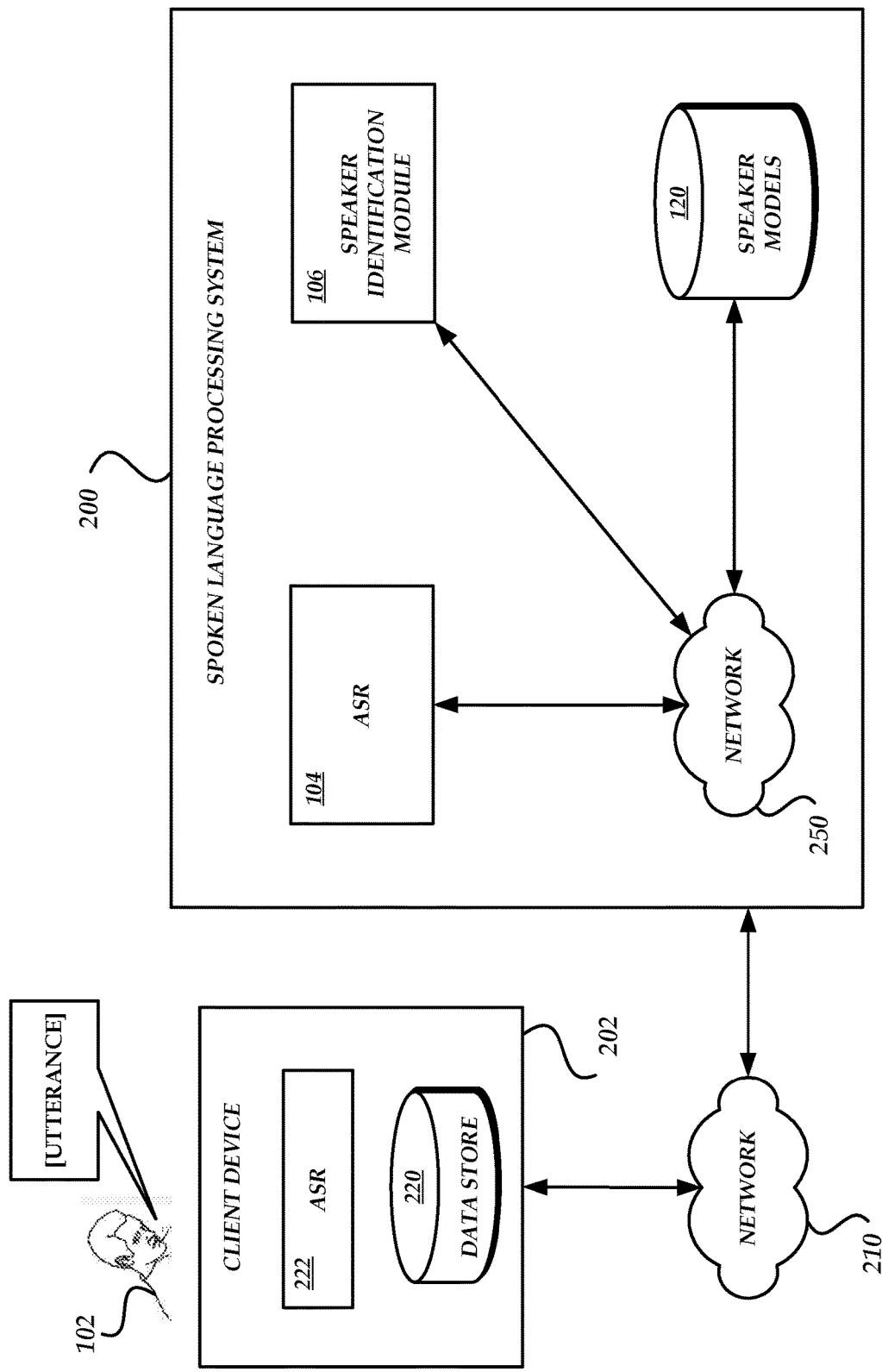
FIG. 2 is a block diagram of an illustrative network computing environment including a client device and a spoken language processing system in communication to process user utterances and identify speakers of the utterances.

FIG. 2 illustrates an example remote spoken language processing system 200 and a client device 202. The spoken language processing system 200 can be a network-accessible system in communication with the client device 202 via a communication network 210, such as a cellular telephone network or the Internet. A user 102 may use the client device 202 to submit utterances, receive information, and initiate various processes, either on the client device 202 or at the spoken language processing system 200. For example, the user 102 can issue spoken commands to the client device 202 in order to get directions, listen to music, initiate phone calls, and the like.

The client device 202 can correspond to a wide variety of electronic devices. In some embodiments, the client device 202 may be a computing device that includes one or more processors and a memory which may contain software applications executed by the processors. The client device 202 may include a microphone or other audio input component for accepting speech input on which to perform speech recognition. The software of the client device 202 may include components for establishing communications over wireless communication networks or directly with other computing devices. Illustratively, the client device 202 may be a mobile device, such as a mobile phone, personal digital assistant ("PDA"), mobile gaming device, media player, electronic book reader, tablet computer, laptop computer, or the like. In some embodiments, the client device

202 may be a substantially stationary device, such as a television with program execution capabilities and network connectivity (a "smart TV"), set-top box, gaming console, home entertainment system, desktop computer, server computer, or the like.

In some embodiments, the client device 202 can include software and/or hardware components for processing user utterances. For example, the client device 202 may include an ASR module 222 and a data store 220. In such cases, the client device 202 may process user utterances to, e.g., determine whether a wake word has been spoken, thereby indicating that the user is addressing the client device 202 and will speak a command. The ASR module 222 may access speech recognition models and other data from the data store 220, and perform speech recognition on the utterance (or a portion thereof) to identify the wake word. If a wake word has been spoken, the client device 202 can provide utterance audio data, preliminary ASR results, and/or other data to the remote spoken language processing system 200 for further processing.

The spoken language processing system 200 can be any computing system that is configured to communicate via a communication network. For example, the spoken language processing system 200 may include any number of server computing devices, desktop computing devices, mainframe computers, and the like. In some embodiments, the spoken language processing system 200 can include several devices physically or logically grouped together, such as an application server computing device configured to perform speech recognition on an utterance and a database server computing device configured to store records and speech recognition models.

The spoken language processing system 200 can include an ASR module 104, a speaker identification module 106, and a speaker models data store 120. In some embodiments, the spoken language processing system 200 can include various modules and components combined on a single device, multiple instances of a single module or component, etc. For example, the spoken language processing system 200 may include a separate database server that may be configured with a speaker models data store 120, and a server or group of servers configured with both an ASR module 104 and a speaker identification module 106. In some embodiments, the spoken language processing system 200 can include additional components not shown in FIG. 2. For example, a spoken language processing system 200 may include an NLU module, application modules, and the like.

In multi-device implementations, the various devices of the spoken language processing system 200 may communicate via an internal communication network 250, such as a corporate or university network configured as a local area network ("LAN") or a wide area network ("WAN"). In some cases, the devices of the spoken language processing system 100 may communicate over an external network, such as the Internet, or a combination of internal and external networks.

In some embodiments, the features and services provided by the spoken language processing system 200 may be implemented as web services consumable via a communication network 210. In further embodiments, the spoken language processing system 200 is provided by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The network 210 may be a publicly accessible network of linked networks, possibly operated by various distinct parties, such as the Internet. In other embodiments, the network 210 may include a private network, personal area network ("PAN"), LAN, WAN, cable network, satellite network, etc. or some combination thereof, each with access to and/or from the Internet. For example, the devices of the spoken language processing system 200 may be located within a single data center, and may communicate via a private network as described above. The client device 202 may communicate with spoken language processing system 200 via the Internet. The client device 202 may have access to the Internet via a wired or WiFi connection, or via a cellular telephone network (e.g., a Long Term Evolution or LTE network).

Sample Process for Generating ASR Results

Figure 3:
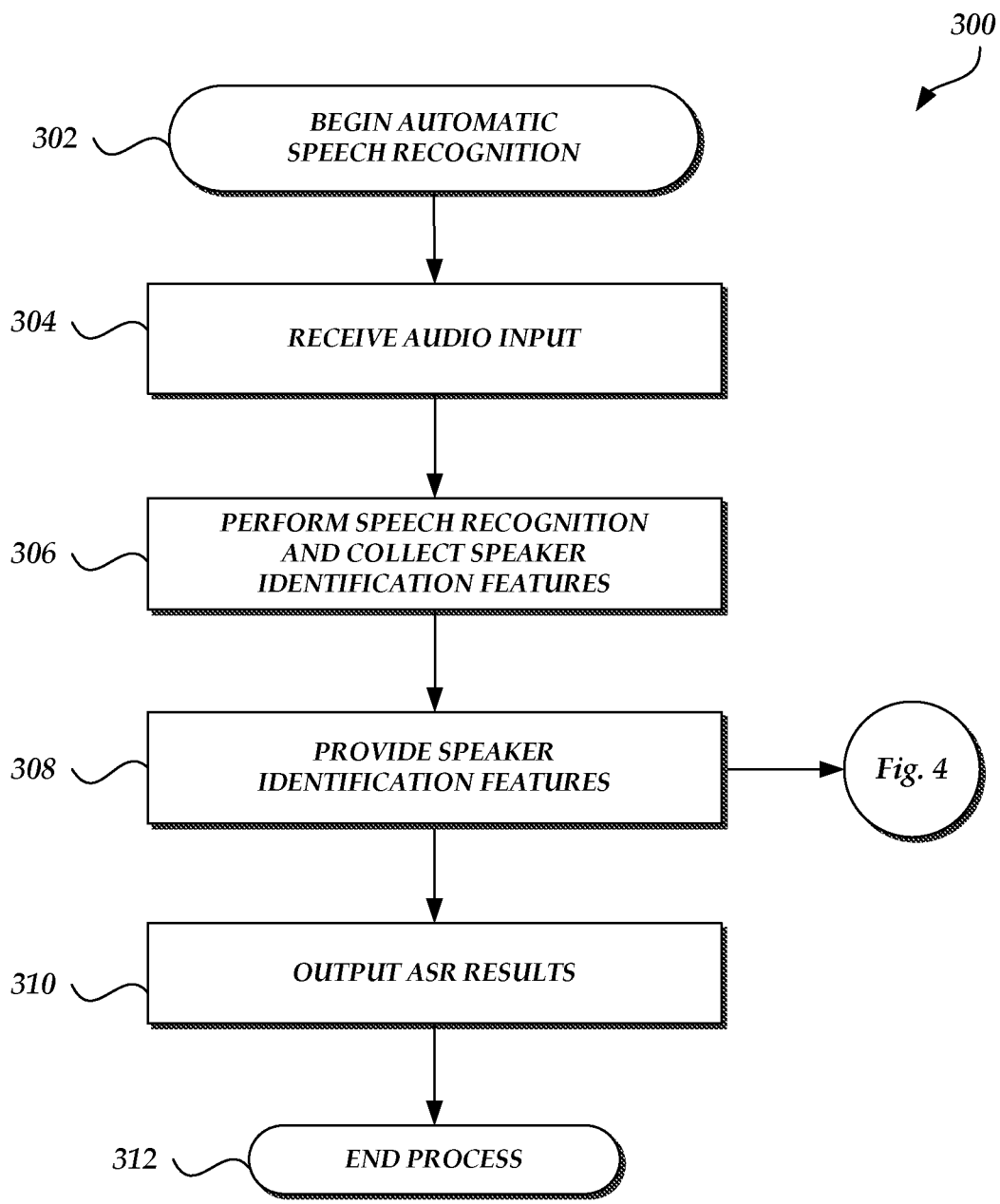
FIG. 3 is a flow diagram of an illustrative speech recognition process that provides speaker identification features for use in identifying speakers of the utterances.

With reference now to FIG. 3, a sample process 300 for processing a user utterance to generate ASR results will be described. Advantageously, an ASR module 104 of a spoken language processing system (e.g., the integrated spoken language processing system 100 or the remote spoken language processing system 200) performing the process 300 can process an utterance and provide speaker-specific information to a speaker identification module 106 for use in determining the identity of the speaker.

The process 300 begins at block 302. The process 300 may begin automatically upon initiation of a speech recognition session or receipt of input data. The process 300 may be embodied in a set of executable program instructions stored on a computer-readable medium, such as one or more disk drives, of a computing system of the spoken language processing system 100. When the process 300 is initiated, the executable program instructions can be loaded into memory, such as RAM, and executed by one or more processors of the computing system.

At block 304, the ASR module 104 or some other module or component of the spoken language processing system can receive an utterance from a client device 202. For example, the user utterance may be a spoken command to play a recorded music file or perform some other action.

At block 306, the ASR module 104 or some other module or component of the spoken language processing system can perform speech recognition on the user utterance to generate one or more transcripts of the utterance. In addition, the ASR module 104 can collect speaker identification features for use by a speaker identification module 106 in determining the identity of the speaker.

Illustratively, the ASR module 104 may implement or be part of a large vocabulary continuous speech recognition ("LVCSR") system that uses acoustic models to generate hypotheses regarding which words or subword units (e.g., phonemes, phonemes in context, triphones, syllables, hidden Markov model states) correspond to an utterance based on the acoustic features of the utterance. In some embodiments, the LVCSR system may be a hidden Markov model ("HMM") based system. In HMM-based systems, words may be modeled as sequences of states that correspond to subword units (e.g., a portion of a triphone). Each state may be associated with a Gaussian mixture model ("GMM") for the corresponding subword unit portion. GMMs can include representations of audio features typically associated with the corresponding subword unit. For example, each GMM can include multiple components (e.g., Gaussian probability density functions), with each component representing a different way in which the corresponding subword unit (e.g., beginning, middle, or end of a triphone) may be spoken or represented within the system. Implementation details of LVCSR systems are well-known to those of skill in the art.

HMM-based LVCSR systems are typically interested in determining the best scoring GMM for a particular frame, rather than the best scoring individual component of a GMM. However, an LVCSR system may nevertheless determine the best scoring individual component of a GMM as part of the process of determining the best scoring GMM. This information, which may otherwise be discarded, can be preserved or saved in order to provide it to the speaker identification module 106. For example, the ASR module 104 can save the sequence of top-scoring GMM components for each state in the recognition result. Other information may also be saved, such as the second-best scoring GMM components, the ratio of the likelihoods of the best and second-best scoring components, etc.

In addition to particular GMM components identified during LVCSR processing, other speaker-specific information may be observed or discovered, and this information may therefore be preserved so that it can be provided to a speaker identification module 106. For example, duration (e.g., the number of frames corresponding to particular subword units), stress, pronunciation, pause fillers (e.g., "umm," "uhh," etc.), prosody, accent, and the like may be observed during LVCSR processing. Advantageously, data regarding these speaker identification features can be preserved, even though such features may be normalized or otherwise downplayed for LVCSR processing.

Figure 4:
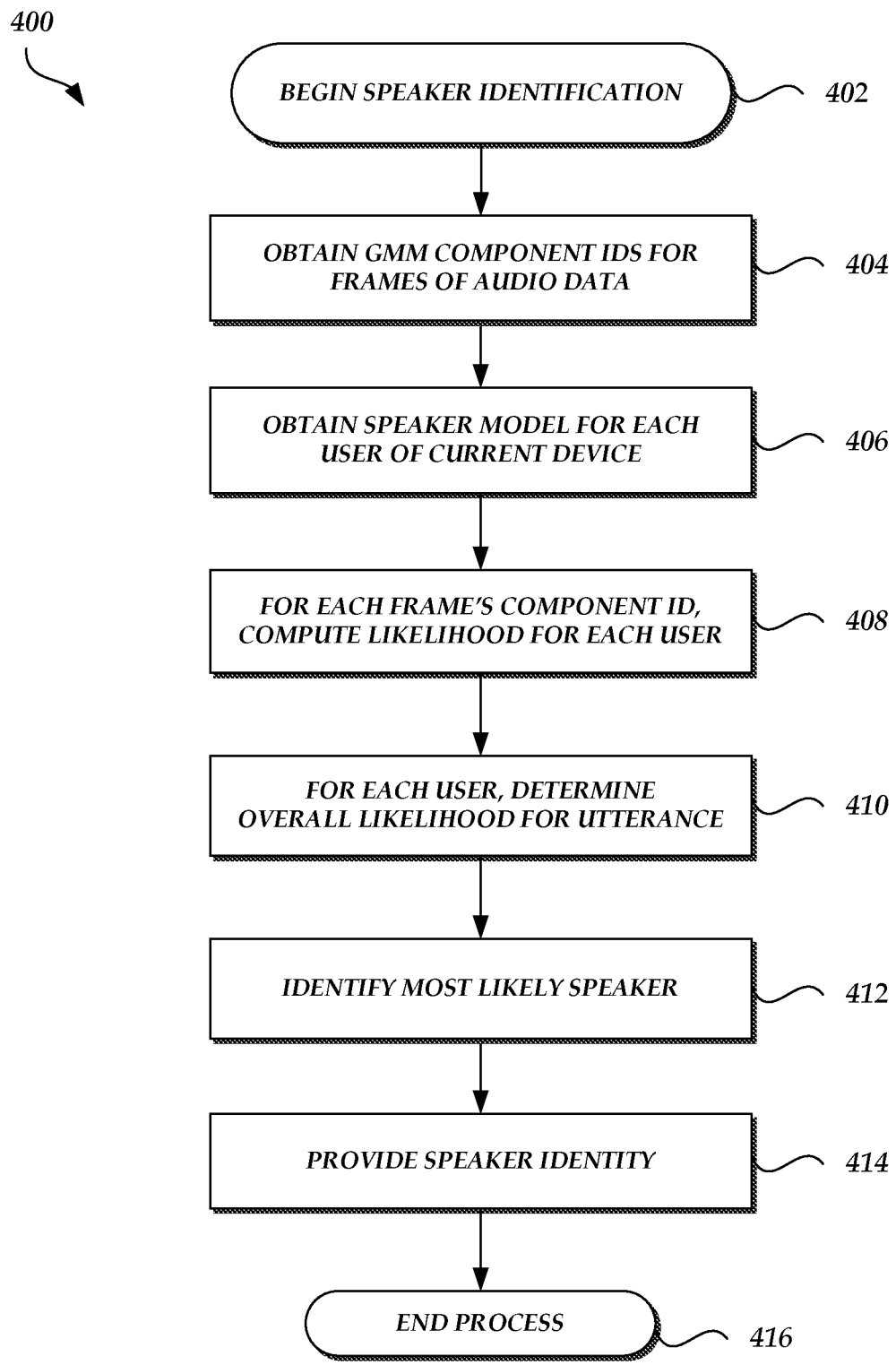
FIG. 4 is a flow diagram of an illustrative speaker identification process for processing speaker identification features of an utterance to identify speakers of the utterances.

At block 308, the ASR module 104 or some other module or component of the spoken language processing system can provide speaker identification features to a speaker identification module 106. Speaker identification features can include the best scoring (or multiple best scoring) GMM components for individual frames of the utterance and the other information described above and elsewhere herein. An example process for using speaker identification features to identify a speaker is illustrated in FIG. 4 and described in detail below. In some embodiments, speaker identification features can be provided to the speaker identification module 106 in a streaming fashion (e.g., after every frame, or in a group after every x frames). In some embodiments, speaker identification features may be streamed after a delay (e.g., after x frames, the first frame may be provided, after x+1 frames, the second frame may be provided, etc.) to allow the ASR module 104 to change its hypotheses for the first frame after processing x frames.

At block 310, the ASR module 104 or some other module or component of the spoken language processing system can provide ASR results to other components of the spoken language processing system or to separate components or devices. For example, the ASR module 104 may provide a transcript or n-best list of transcripts of the utterance to an NLU module, application software, a separate client device, or the like. The process 300 may then terminate at block 312.

Sample Process for Identifying a Speaker

With reference now to FIG. 4, a sample process 400 for processing speaker identification features and other information in order to determine the identity of a speaker will be described. Advantageously, a speaker identification module 106 can use information that is typically discarded, ignored, normalized, or otherwise downplayed in order to determine the identity of a speaker without requiring the speaker to provide identity-related information in addition to a spoken command.

The process 400 begins at block 402. The process 400 may begin automatically upon initiation of a speech recognition session or receipt of speaker identification features.

The process 400 may be embodied in a set of executable program instructions stored on a computer-readable medium, such as one or more disk drives, of a computing system of the spoken language processing system 100. When the process 400 is initiated, the executable program instructions can be loaded into memory, such as RAM, and executed by one or more processors of the computing system.

At block 404, the speaker identification module 106 or some other module or component of the spoken language processing system can receive speaker identification features, such as information regarding individual frames of audio data and which component(s) of the corresponding GMM scored best. As described above, other speaker-specific information may be obtained, such as information observed or discovered during ASR processing of the current utterance.

At block 406, the speaker identification module 106 or some other module or component of the spoken language processing system can obtain a user model for one or more users of the spoken language processing system. For example, a particular client device 202 may be normally used by a small set of users. Utterances received by a remote spoken language processing system 200 from the client device 202 are likely to have been made by one of the small set of users. The speaker identification module 106 can therefore load user models from the user models data store 120 for those users associated with the particular client device 202.

The model for a particular user can include information about which values of speaker identification features are associated with the user. For example, a model may include a histogram for each subword unit (e.g., triphone, phoneme, phoneme state, or phoneme portion) of a language. The histograms may reflect the individual GMM components that typically score highest during ASR processing of those utterances, by the speaker, that include the particular subword unit to which the GMM corresponds. The histograms may be based on observations from ASR processing of multiple utterances made by the user over time. For example, each time the particular user makes an utterance that is processed by the spoken language processing system and identified as coming from the user, data regarding the best scoring individual GMM components can be recorded and added to the histogram or some other element of the user model for the user.

At block 408, the speaker identification module 106 or some other module or component of the spoken language processing system can, for a current frame, compute a separate score for each user. This procedure may be repeated for each frame of the utterance, or some subset thereof. For example, an individual score may reflect the likelihood that a particular user made the current frame. The speaker identification module 106 may identify the subword unit (e.g., beginning, middle, end of a phoneme) that corresponds to the frame and the best scoring GMM component for the frame by analyzing information received from the ASR module 104. The speaker identification module 106 can then compute a likelihood score for each user based on the histograms, corresponding to the subword unit for the current frame, of the speaker models for the speakers.

Figure 5:
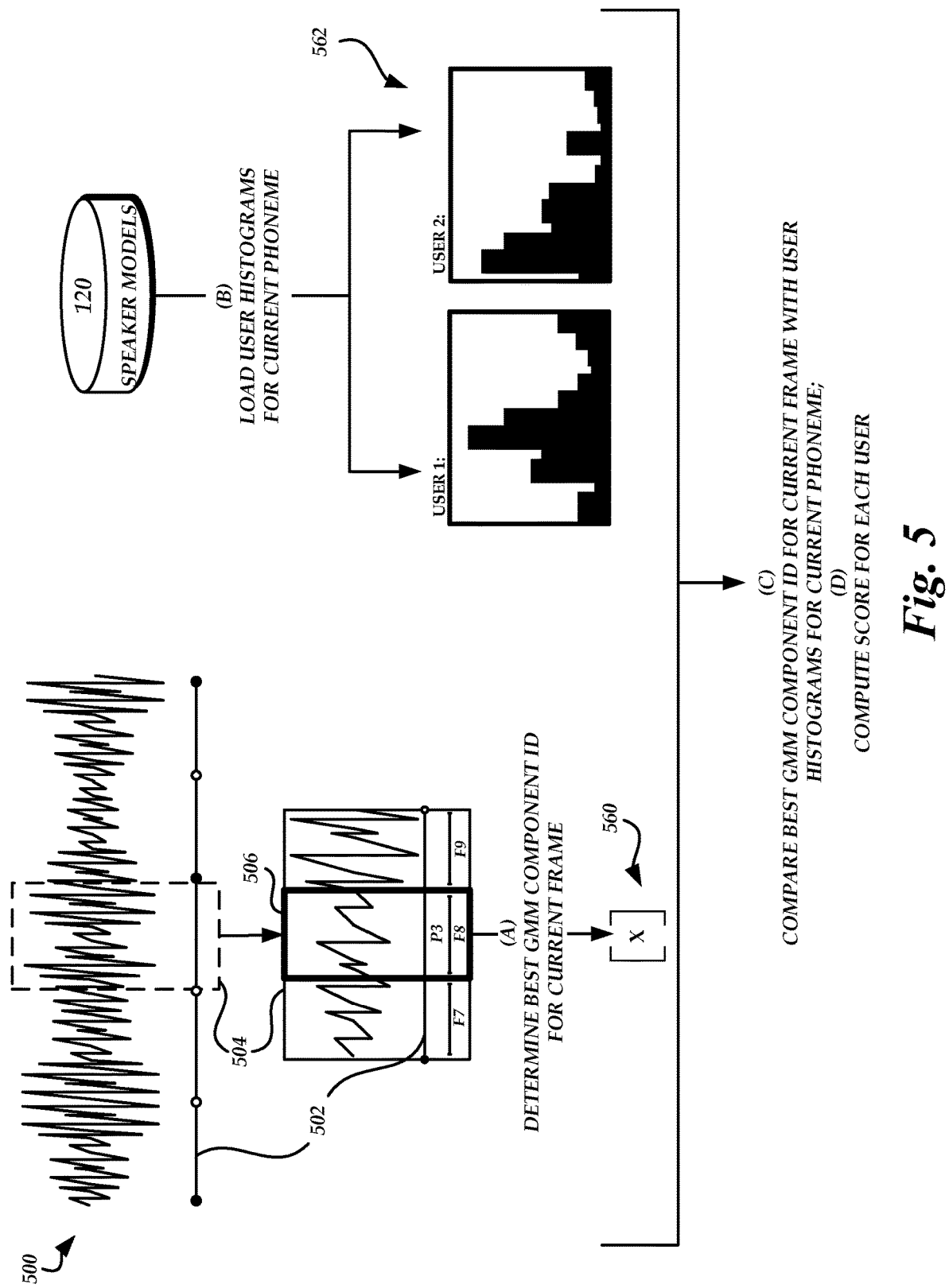
FIG. 5 is a diagram of frames of an illustrative utterance and example histograms of speaker identification features associated with a frame of the utterance.

FIG. 5 shows an illustrative representation of an utterance 500. The frames of the utterance 500, as processed by the ASR module 104, correspond to a sequence 502 of subword units. A portion 504 of the utterance that corresponds to an instance of a particular subword unit (P3) has been enlarged. The portion 504 includes three frames F1, F2, and F3, and the three frames correspond to the beginning, middle, and end of the instance of subword unit P3. The example frames are illustrative only, and are not intended to be limiting. As will be appreciated by one of skill in the art, multiple frames may be associated with each portion of the instance of subword unit P3 (e.g., depending upon how quickly the speaker was speaking when making the utterance or depending on the kind of multiphone-modeling techniques that are employed). Accordingly, there may be more than three frames associated with each instance of each subword unit of the utterance. A particular GMM component 560 is indicated as being the highest-scoring GMM component for frame F8, which corresponds to the middle of the instance of subword unit P3.

As described above, in order to compute a likelihood score for individual speakers, a histogram of GMM component likelihoods for the subword unit corresponding to the current frame may be used. FIG. 5 illustrates histograms 562, associated with two separate users, that correspond to the current subword unit (e.g., the middle of a phoneme in subword unit P3). The speaker identification module 106 can determine the likelihood that each user made the current frame by computing a score for the frame based on the histograms and the best scoring GMM component for the current frame. A histogram is one example form of modeling that may be used. In general, any of a number of discrete modeling and classification techniques could be applied (e.g., a Support Vector Machine ("SVM") or Deep Belief Network).

Block 408 can be repeated for each frame of utterance data that is to be processed. For example, the speaker identification module 106 may be implemented using HMMs. Each frame may be scored against states of an HMM for the particular subword unit that the ASR module 104 has recognized for the frame. Each state of the HMM may be associated with a histogram, for a user or set of users, for the corresponding subword unit (e.g., phoneme state or portion). In this way, the sequence of frames for a particular subword unit may play a role in the determination of overall scores for each user. Overall scores for each subword unit of the utterance may be collected for use below in determining an overall score for each user or some subset thereof. In some embodiments, HMMs, Conditional Random Fields ("CRFs"), or any other sequentially-structured modeling technique may be used to model the sequence of frames.

In some embodiments, the frames that may be processed as described herein may be limited to a subset of all frames of the utterance. For example, speaker identification may be limited to frames associated with a wake word or other keywords that are often spoken. Limiting speaker identification processing to certain keywords can ensure that a critical mass of observed GMM components have been obtained for each user and each utterance associated with the keyword.

In some embodiments, a speaker identification module 106 may use various techniques known to those of skill in the art in addition to, or instead of, HMMs. For example, speaker identification module 106 may use neural networks, bags of components, bags of pairs, minimum edit distance, conditional random fields, or any clustering and classification method appropriate to time series features.

At block 410, the speaker identification module 106 or some other module or component of the spoken language processing system can determine an overall likelihood score for each user reflecting the likelihood that each user made the present utterance. Illustratively, the speaker identification module 106 may multiply, for a given user, the likelihood scores for each individual frame, as computed above in block 408, in order to determine an overall score for the given user. The speaker identification module 106 can repeat this procedure for each user.

At block 412, the speaker identification module 106 or some other module or component of the spoken language processing system can identify the most likely speaker of the current utterance. The most likely speaker may be the speaker with the highest overall likelihood score, for the current utterance, as computed above in block 410.

At block 414, the speaker identification module 106 or some other module or component of the spoken language processing system can provide a speaker identifier or some other data reflecting the most likely speaker of the current utterance. As described above, the speaker identification module 106 can provide the speaker identifier to an NLU module, application module, speaker authenticator, or the like. The process 400 may then terminate at block 416.

Additional Embodiments

As described above, a client device 202 may typically be used by a small set of regular users (e.g., 5). In order to maintain user profiles for each user of the device, speaker identification may be performed using the user models for the small set of regular users and a default user model that is intended to provide the best score for most or all potential users that are not included in the small set of regular users. If the default user model is the best scoring model for a particular utterance, that may indicate that a different user (e.g., one not included in the small set of regular users) has made the utterance. The default model may be added to the small set models for regular users in place of, e.g., the least-recently-used user model, worst-scoring user model, etc. The default user model may then be modified to account for speaker identification features of the new user, as described above. Subsequent utterances may be processed using the small set of regular users, including the newly-added and modified default model, and another default model.

In some embodiments, a spoken language processing system may include or be associated with a user interface ("UI") for explicitly identifying users, or for querying users regarding their identity when the system is uncertain. In cases where a higher degree of certainty is required (e.g. authorization for purchases, accessing private data), users may be associated with an identifying phrase or passphrase. A sequential model for the phrase can be trained for the user. Audio data from other users speaking the same phrase would not match the sequence as precisely as the user for which the model was trained. The result from processing audio of the phrase against the user-specific model may be one factor in a multifactor authentication regime. Decision and confidence thresholds may be set based on the security/privacy needs of the particular application, at the present time, etc.

In some embodiments, the spoken language processing system may have a UI for the user to provide longer phrases or to use words that have more discriminative power. The UI may prompt the user for better passphrases based on evidence it has regarding the likelihood of other users being confused with the present user.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
computer-readable memory storing executable instructions; and
one or more processors in communication with the computer-readable memory, wherein the one or more processors are programmed by the executable instructions to at least:
receive audio data representing an utterance, wherein a first portion of the audio data corresponds to a wake word portion of the utterance, and wherein a second portion of the audio data following the first portion of the audio data corresponds to a command portion of the utterance;
determine command data representing the command portion of the utterance using the second portion of the audio data;
determine speaker identifier data using user data and at least one of the first portion of the audio data or the second portion of the audio data;
determine a score, associated with the speaker identifier data, representing a likelihood the utterance was made by a particular person;
send the command data to a natural language understanding ("NLU") subsystem; and
send the speaker identifier data to the NLU subsystem.

2. The system of claim 1, wherein the executable instructions to determine the speaker identifier data comprise executable instructions to determine the speaker identifier data substantially concurrently with determining at least a portion of the command data.

3. The system of claim 2, wherein the speaker identifier data being determined substantially concurrently with determining the portion of the command data comprises the speaker identifier data being determined based at least partly on scoring information used to determine the portion of the command data.

4. The system of claim 1, wherein the one or more processors are further programmed by the executable instruction to at least:
prior to receiving the audio data representing the utterance:
receive prior audio data representing a prior utterance; and
generate the user data based at least partly on the prior audio data.

5. The system of claim 1, wherein the user data represents at least one of: a vocal stress, an accent, or a pause filler.

6. The system of claim 1, wherein the user data indicates an acoustic feature that corresponds to the speaker identifier data.

7. The system of claim 6, wherein the one or more processors are further programmed by the executable instructions to determine that a second acoustic feature of the audio data corresponds to the acoustic feature.

8. The system of claim 1, wherein the one or more processors are further programmed by the executable instructions to at least:
identify, for a first frame of the audio data, a first component of a speech recognition model based at least partly on a first likelihood that the first component corresponds to a first subword unit of the utterance; and
identify, for a second frame of the audio data, a second component of the speech recognition model based at least partly on a second likelihood that the second component corresponds to a second subword unit of the utterance.

9. The system of claim 8, wherein the one or more processors are further programmed by the executable instructions to at least:
determine a first score using the user data and the first component; and
determine a second score using the user data and the second component, wherein the score is based at least partly on the first score and the second score.

10. The system of claim 1, wherein the executable instructions to determine the command data comprise instructions to determine the command data using an automatic speech recognition ("ASR") subsystem separate from the NLU subsystem.

11. A computer-implemented method comprising:
as implemented by one or more computing devices configured to execute specific instructions,
receiving first audio data representing a first utterance;
generating user data based at least partly on a first portion of the first audio data, wherein the first portion corresponds to a first wake word portion of the first utterance;
receiving second audio data representing a second utterance;
generating command data corresponding to a command portion of the second utterance;
generating speaker identifier data using the user data and a second portion of the second audio data, wherein the second portion corresponds to a second wake word portion of the second utterance;
sending the command data to a natural language understanding ("NLU") subsystem; and
sending the speaker identifier data to the NLU subsystem.

12. The computer-implemented method of claim 11, wherein generating the user data comprises generating data representing an acoustic feature of the first portion of the first audio data.

13. The computer-implemented method of claim 11, further comprising generating automatic speech recognition ("ASR") result data using the first portion, wherein generating the user data is based at least partly on the ASR result data.

14. The computer-implemented method of claim 11, further comprising:
generating second user data based at least partly on the second portion of the second audio data; and
generating second speaker identifier data using the second user data.

15. The computer-implemented method of claim 14, wherein generating the second user data is further based at least partly on the user data.

16. The computer-implemented method of claim 11, further comprising performing NLU using the command data and the speaker identifier data, wherein performing NLU and generating the speaker identifier data are executed by a same device.

17. The computer-implemented method of claim 11, further comprising determining data representing a vocal stress to the first portion of the first utterance, wherein generating the user data is based at least partly on the data representing the vocal stress.

18. The computer-implemented method of claim 11, further comprising:
identifying, for a first frame of the second audio data, a first component of a speech recognition model based at least partly on a first likelihood the first component corresponds to a first subword unit of the second utterance; and
identifying, for a second frame of the second audio data, a second component of the speech recognition model based at least partly on a second likelihood the second component represents a second subword unit of the second utterance.

19. The computer-implemented method of claim 18, further comprising:
determining a first score using the user data and the first component; and
determining a second score using the user data and the second component, wherein the speaker identifier data is generated based at least partly on the first score and the second score.

20. The computer-implemented method of claim 11, wherein generating the user data is further based on at least one of: a duration of a particular subword unit state in speech recognition processing; a pronunciation of a word used in the first utterance; vocal stress to a portion of the first utterance; a vocal-track-length-normalizing factor used in speech recognition processing; a channel means normalization used in speech recognition processing; a constrained maximum likelihood linear regression transform used in speech recognition processing; a time of day; or a recent pattern of system usage.

* * * * *